United States Patent [19] [11] 4,210,129
O'Hanlon [45] Jul. 1, 1980

[54] SOLAR HEAT COLLECTOR

[76] Inventor: Edward J. O'Hanlon, Assembly Point, Lake George, N.Y. 12845

[21] Appl. No.: 911,051

[22] Filed: May 30, 1978

[51] Int. Cl.² .......................... F24J 3/02; F28F 13/00
[52] U.S. Cl. .................................. 126/447; 126/449; 165/133; 165/181
[58] Field of Search ............... 126/270, 271, 447, 446, 126/448, 449; 237/1 A; 165/133, 171, 172, 177, 181, 183

[56] References Cited

U.S. PATENT DOCUMENTS

| 201,439 | 3/1878 | Moreau | 126/270 |
| 3,102,532 | 9/1963 | Shoemaker | 126/270 |
| 3,875,925 | 4/1975 | Johnston | 126/270 |
| 3,960,135 | 6/1976 | Angilletta | 126/270 |
| 3,991,742 | 11/1976 | Gerber | 126/449 |
| 4,011,855 | 3/1977 | Eshelman | 126/270 |
| 4,072,142 | 2/1978 | Lof | 126/449 |
| 4,095,428 | 6/1978 | Warren | 126/449 |
| 4,114,599 | 9/1978 | Stephens | 126/449 |
| 4,155,346 | 5/1979 | Aresty | 126/447 |

FOREIGN PATENT DOCUMENTS 2629086 12/1978 Fed. Rep. of Germany ........... 126/449

Primary Examiner—James C. Yeung
Assistant Examiner—Daniel J. O'Connor
Attorney, Agent, or Firm—Pollock, Vande Sande & Priddy

[57] ABSTRACT

The present invention is directed to a solar heat collecting assembly including a metallic container defining a solar heat collecting space therein. A pair of spaced screen assemblies extend through the heat collecting space and a metallic tube is arranged between the screen assemblies for providing a liquid passageway through said container. A layer of highly reflective material borders the heat collecting space and reflects low micron heat waves toward the screen assemblies and tube to increase the effective heat transfer capability of the container.

11 Claims, 5 Drawing Figures

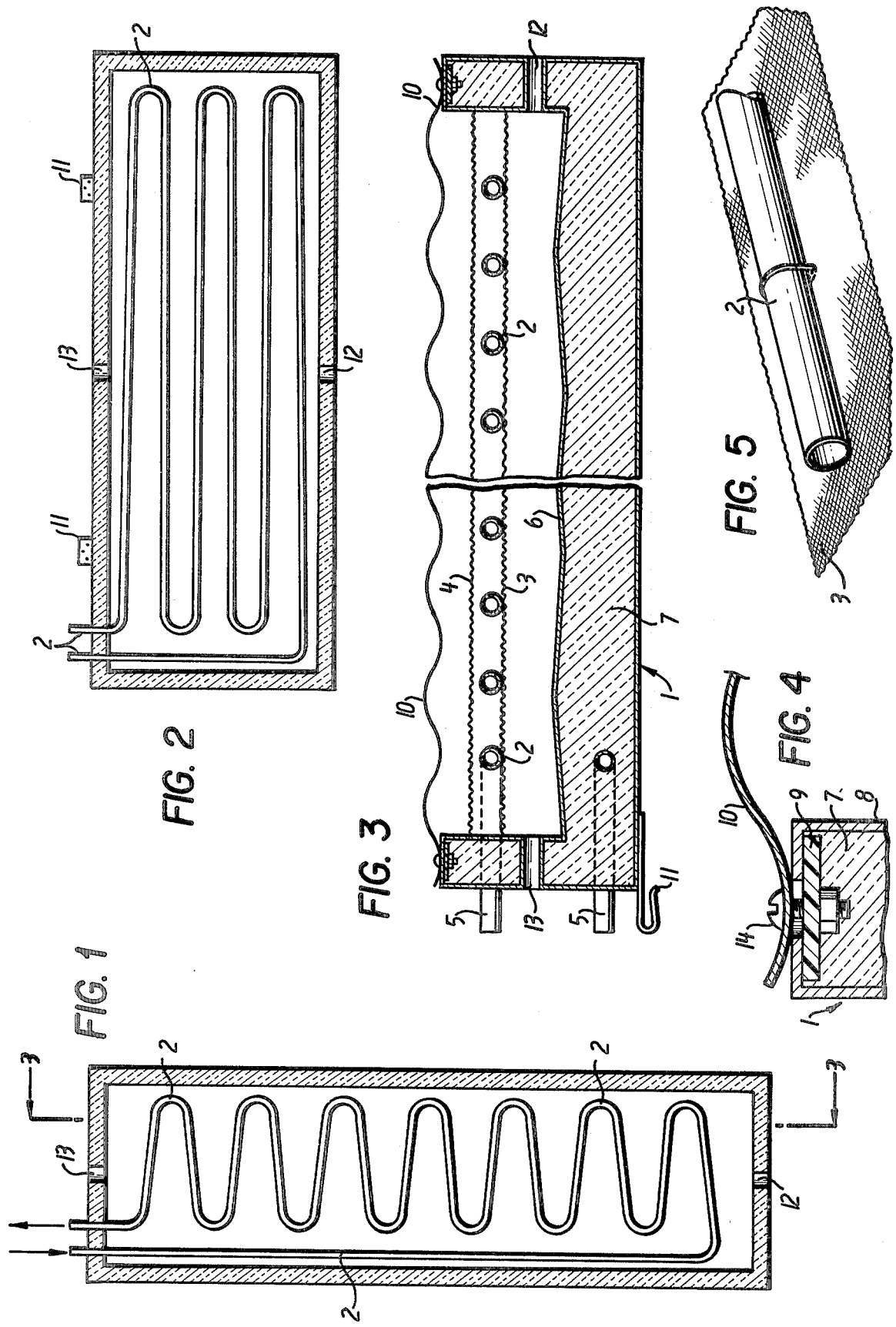

SOLAR HEAT COLLECTOR

BACKGROUND OF THE INVENTION

In my copending U.S. patent application Ser. No. 889,029, I show and describe a low cost solar energy collector using a blackened fly screen chamber enclosing a space through which air arises upwardly, carrying heat with it into a sheltered structure collected solar heat. The invention in Ser. No. 889,029 is shown as part of a wall of a building, situated between two upright posts carrying a roof structure, said posts resting on under ground footings.

SUMMARY OF THE PRESENT INVENTION

The present invention could be of this same construction, however I choose to present it as a box-type solar collector that can become part of a wall. Once in position the solar collector can be relieved of both solar heated liquid and solar heated gas, emptying both types of solar heat into the shelter structure of which said wall forms a part.

BRIEF DESCRIPTION OF THE DRAWINGS

In the drawings;

FIG. 1 shows a box type solar heat collector in which the tubing carrying a liquid working fluid serpintines crosswise through the box;

FIG. 2 shows a similar box type solar heat collector in which the tubing carrying the liquid working fluid serpintines lengthwise through the box;

FIG. 3 shows a sectional view through FIG. 1;

FIG. 4 shows an enlarged detail of a part of FIG. 3;

FIG. 5 shows an enlarged detail of parts shown in FIG. 3.

DETAILED DESCRIPTION OF THE PREFERRED EMBODIMENT

Among the drawings, numeral 1 indicates a metal box or container, numeral 2 a blackened water tube, 3 woven aluminum or copper filiment or fly screen, 4a woven aluminum or copper filiment or cloth, and numeral 5 shows return water tube after coming through the insulation in FIG. 1. Numeral 6 is highly mirror type reflecting, or white surface reflecting corrugated sheet or plate to reflect sunlight back onto tubing 2, while numeral 7 refers to a high density plastic rigid foam insulation. Likewise, numeral 8 is vertical internal wall of said part 6. Numeral 9 is a non-heat conductive cross plate extending between parts 1 and part 6, a. 10 is a transparent or translucent box cover of either glass or plastic, with 11 indicating hinges for mounting the solar heat collector. 12 indicates opening for admitting air to solar heat collector, while 13 shows an opening for removing solar heated air from solar from solar heat collector. The above numerals show quite clearly the location of the various components of the present invention.

In the placement of the two separate filiments of woven metal cloth room there is left near their bottom edges space for cool air to enter said space between the filiments, and an equivalent space is left near the top edges of said filiments for the solar heated air to leave the space where it has been solar heated, and go from there into the shelter structure where said solar heat thus collected is to be of use.

It will be noted that the water tubing lies directly on one of the filiments to receive all the solar heat possible from touching the metal cloth.

The drawings also indicate that the water tube enters and exits the box 1 at locations fairly near together at one end of the box as shown in both FIGS. 1 and 2. This arrangement minimizes the length of additional water tubing necessary for supplying water to and removing water from the collector.

I am not to be restricted to using blackened fly screens. Any other form of blackened copper or aluminum finely porous or woven filiment may be used to achieve my desired solar heat collecting ends.

Since the solar heat waves come to my solar heat collector in a wide variety of waves and wave forms, in order to properly capture and collect the low micron heat waves the special design of my collector interior permits the capture and retention of greater amounts of solar energy and a definitely reduced emmissivity of collected solar heat back out into outer space.

The corrugated geometric design and the inner reflectivity of the highly reflective inner surface layer combine with the blackened filaments to improve absorbtivity thus increasing the solar heat capture rate.

My generally improved thermo dynamic design utilizing the five separate surfaces and their five separate and respective temperatures heat thus avoid most of the emmissivity of my captured solar heat back to the outside of the collector.

Therefore, my invention resides in my method of placement of the various surface parts of my solar heat collector to achieve the success here above expressed. Both apparatus and process improvements are thus satisfactorily employed.

I claim:

1. A solar heat collecting assembly comprising:
   a thin-walled, hollow container including a plurality of attached, metallic side walls and a metallic bottom wall extending between end portions of each of said side walls for partially defining a solar heat collecting space therebetween;
   a substantially rigid layer of high density plastic foam completely covering surface portions of said side walls and said bottom wall facing said solar heat collecting space for preventing the transfer of heat through said side walls and said bottom wall, respectively;
   a layer of highly reflective material mounted on all surface portions of said plastic foam facing said heat collecting space;
   a sheet of heat transmitting material completely covering said heat collecting space and having end portions fixedly attached to confronting end surfaces of said high density plastic foam;
   a pair of parallel extending screen assemblies positioned within said solar heat collecting space and extending substantially parallel to said bottom wall of said hollow container, each screen assembly having end portions attached to said layer of highly reflective material and each screen assembly having openings sufficient to allow the passage of low micron heat waves therethrough;
   tube means positioned between said parallel extending screen assemblies, with said tube means having opposite end portions each extending through a separate opening in a wall of said hollow container for providing a liquid flow passageway through said heat collecting space and between said screen assemblies, whereby heat captured by said tube means and said screen assemblies is transferred to the liquid flowing through said tube means.

2. A solar heat collecting assembly according to claim 1, wherein a portion of said layer of highly reflective material confronting said bottom wall of said container including means for reflecting heat waves toward said pair of screen assemblies and said tube means positioned therebetween.

3. A solar heat collecting assembly according to claim 2, wherein said means comprises said portion of said layer having a substantially corrugated cross-sectional configuration capable of bouncing heat waves toward said pair of screen assemblies.

4. A solar heat collecting assembly according to claim 1, wherein said tube means contacts at least one of said parallel extending screen assemblies to increase the rate of heat transfer therebetween.

5. A solar heat collecting assembly according to claim 1, wherein said tube means comprises a blackened, metallic tube having a substantially serpentine configuration.

6. A solar heat collecting assembly according to claim 1, wherein each of said screen assemblies is formed of blackened copper woven filament.

7. A solar heat collecting assembly according to claim 1, wherein each of said screen assemblies is formed of blackened aluminum woven filament.

8. A solar heat collecting assembly according to claim 1, wherein a thin strip of low heat conducting material extends between end portions of each side wall and said layer of highly reflective material to minimize the transfer of heat therebetween.

9. A solar heat collecting assembly according to claim 1, wherein said sheet of heat transmitting material has a corrugated cross-sectional configuration.

10. A solar heat collecting assembly according to claim 1, wherein gas flow passageway means extending through said container and joining said solar heat collecting space for providing a continuous gas flow passageway completely through said container, whereby gas introduced into said passageway means at a first temperature is heated during passage through said solar heat collecting space and is removed from said passageway means at a second, warmer temperature.

11. A solar heat collecting assembly according to claim 10, wherein said gas flow passageway means comprises an inlet passageway extending completely through a side wall portion of said container and an outlet passageway extending completely through an opposite side wall portion of said container.

* * * * *